Dec. 31, 1957  K. E. CRESS  2,817,919
BOW FISHING ADAPTER
Filed Aug. 2, 1956
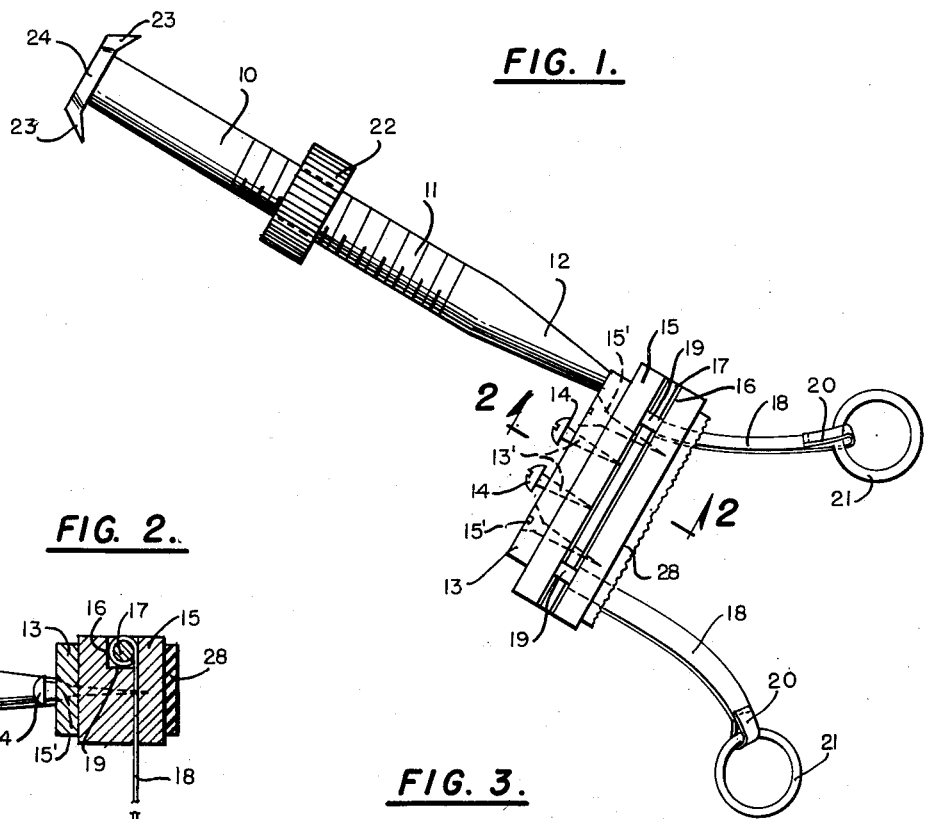
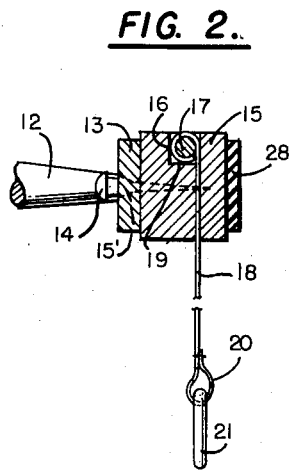
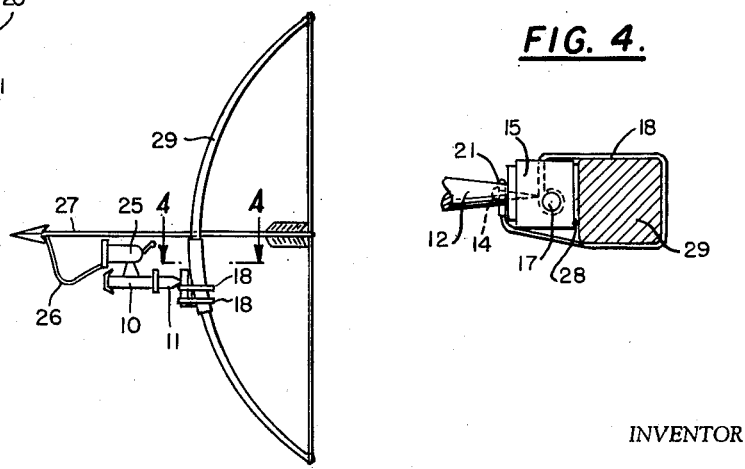
INVENTOR
KEITH E. CRESS "# United States Patent Office 2,817,919
Patented Dec. 31, 1957

2,817,919
BOW FISHING ADAPTER
Keith E. Cress, Monterey, Calif.

Application August 2, 1956, Serial No. 601,688

5 Claims. (Cl. 43—22)

This invention relates to attachments for fishing bows.

It is an object of the present invention to provide an adapter for fishing bows which will provide a novel means for securely fastening a spinning reel to the fishing bow having a line wound thereon which will be attached to the head of the arrow.

It is another object of the present invention to provide a fishing bow adapter of the above type which may be easily and readily mounted on the bow with a minimum of time and effort, and as readily removed therefrom.

Other objects of the invention are to provide a fishing bow adapter, bearing the above objects in mind, which is of simple construction, has a minimum number of parts, is inexpensive to manufacture and efficient in use.

For other objects and for a better understanding of the invention, reference may be had to the following detailed description taken in connection with the accompanying drawing, in which:

Figure 1 is a side elevational view of a preferred embodiment of the present invention;

Fig. 2 is a transverse sectional view taken along the line 2—2 of Fig. 1;

Fig. 3 is a side elevational view of the invention shown in operative use on a fishing bow; and Fig. 4 is a transverse sectional view taken along the line 4—4 of Fig. 3.

Referring now more in detail to the drawing, 10 represents a cylindrical rod having an externally threaded central portion 11 and a tapered shank 12 integrally formed at right angles thereto with the flat handle portion 13, substantially as illustrated.

The handle 13 is provided with a pair of mounting openings 13′ which receive therethrough the round head screws 14 and by means of which the handle 13 is secured to the hard wood block base 15. The handle 13 is further secured to the hard wood block base 15 by means of the countersunk screws 15′ and countersunk mounting openings provided in the handle 13, as will be obvious. The heads of the screws 14 are freely spaced from the handle 13 for a purpose which will hereinafter become clear.

The block 15 on one face is provided with the groove 16 within which is positioned the pin 17. A pair of heavy rubber bands 18 are formed at one end with the loops 19 which are positioned on the pin 17, passing upwardly through suitable openings provided in the block 15 therefor, whereby to attach the rubber bands 18 to the block. Loop portions 20 are provided at the other ends of the rubber bands and receive therethrough the rings 21.

An internally threaded sleeve 22 is screwed onto the externally threaded portion 11 and cooperates with the tips 23 of the receiving cap 24 to securely mount therebetween the fishing reel or spinning reel 25 (Fig. 3) having wound thereon the line 26 which is connected to the arrow 27. On the upper and lower surfaces of the threaded portion 11, the threads have been removed for the full length of the threaded area to receive the base of the spinning reel, as will be obvious.

A strip of corduroy rubber 28 is secured to the face of the block 15 to prevent the adapter from slipping or marring the bow 29 after having been attached thereto as will hereinafter become clear.

Although in the drawing, the prongs 23 have been provided on both the upper and lower portions of the cap 24 to permit the reel on the top or bottom of the rod, to be mounted, it will be readily apparent to those skilled in the art that only one prong may be provided on the top to permit the positioning thereon of the spinning reel only on the top of the rod.

To mount the device, the rubber bands 18, after the corduroy rubber pad 28 has been positioned against the bow 29, are slipped around the bow and the rings 21 are looped over the screws 14 thereby providing a quick, sure means for securing the device to the bow. The bands 18 are connected to the pin 17 and then pulled tight. By means of the threaded portion 11, the sleeve 22 may be advanced toward the cap 24 to provide a means for securely fastening the spinning reel to the device, as shown in Fig. 3. The arrow 27 may then be retrieved after having been shot.

While various changes may be made in the detail construction, it shall be understood that such changes shall be within the spirit and scope of the present invention as defined by the appended claims.

What I claim as new and desire to protect by Letters Patent of the United States is:

1. A fishing bow adapter adapted to be attached to a fishing bow comprising a shaft integrally formed at one end with a laterally disposed flat handle portion, a base block, means for securing said handle portion to said base block, a plurality of resilient straps, means for securing said straps at one end to said base block, means for securing the other ends of said straps in a releasable manner to said handle after being looped around the bow, said shaft at its central portion being externally threaded, a ring at one end of each of said straps, an internally threaded sleeve adjustable over said externally threaded portion, and an end cap on the end of said shaft remote from said handle adapted to cooperate with said sleeve whereby to mount therebetween a spinning reel.

2. A fishing bow adapter according to claim 1, said means for mounting said handle to said block comprising said handle having a plurality of first mounting openings formed therethrough and a plurality of second countersunk mounting openings formed therein, screw means passing through said mounting openings into said block, the heads of said screw means being freely spaced from the handle and adapted to receive thereon said rings after said resilient straps have been wound around the bow, said rings secured to the ends of said straps being adapted to be looped onto said screw means, and countersunk screw means within said second mounting openings further securing said handle to said block.

3. A fishing bow adapter according to claim 2, said means for securing the ends of said resilient straps to said block comprising said block on one side having an elongated groove, a pin positioned within said groove, said resilient straps being formed with loops at the ends thereof remote from said rings receiving said pin therethrough, said block having openings receiving said straps therethrough and permitting their extension through the other side of the block for positioning said rings on said first screw means.

4. A fishing bow adapter according to claim 3, including a resilient pad secured to the face of said block adjacent the bow to increase the friction therebetween.

5. A fishing bow adapter according to claim 4, adapted to have a spinning reel attached thereto, said end cap having at least one prong adapted to engage one end of the base of the spinning reel in cooperation with said sleeve when tightened thereagainst.

References Cited in the file of this patent

UNITED STATES PATENTS 1,457,983     Malone _____ June 5, 1923